Patented Nov. 21, 1939

2,181,100

UNITED STATES PATENT OFFICE 2,181,100

ETHERS OF HYDROGENATED PHENOLS

Harold R. Slagh and Francis N. Alquist, Midland, Mich., assignors to The Dow Chemical Company, Midland, Mich., a corporation of Michigan No Drawing. Application August 17, 1938, Serial No. 225,419

6 Claims. (Cl. 260—348)

This invention relates to ethers of hydrogenated phenols and is particularly concerned with compounds having the formula

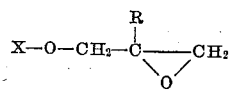

wherein X—O represents a hydrogenated phenol residue and R represents the methyl radical or hydrogen. The term "hydrogenated phenol residue" as herein employed includes the radicals derived from those hydroxy compounds obtained in the catalytic hydrogenation of phenol and nuclear-substituted derivatives thereof, e. g. cyclohexanol, halo-cyclohexanols, alkyl-cyclohexanols, tetrahydro-naphthols, cyclohexyl-phenols, phenyl-cyclohexanols, cyclohexyl-cyclohexanols, and the like. These ether compounds have been found particularly useful as modifiers for synthetic plastics, as perfume bases, and as insecticidal toxics.

Our new compounds may be prepared by reacting a sodium salt of a hydrogenated phenol compound with 1-chloro-propylene-oxide-2,3 or 1-chloro-2-methyl-propylene-oxide-2,3. For example, the hydrogenated phenol compound may be reacted with metallic sodium to form the sodium salt, and such salt thereafter reacted with 1-chloro-propylene-oxide-2,3 under substantially anhydrous conditions. The reaction is carried out in the presence of a substantially inert solvent. When the hydrogenated phenol compound is a sufficiently mobile liquid, an excess thereof may be employed as the reaction medium, otherwise a solvent such as toluene or benzene is employed. The reaction is carried out by heating the mixture to a temperature between 60° C. and the boiling temperature of the reaction mixture. When the reaction is complete, the mixture is cooled, filtered to remove sodium chloride and unreacted sodium salt of the hydrogenated phenol, and the filtrate distilled to obtain the desired ether compound. In carrying out the reaction according to the above procedure, we generally employ an appreciable excess of the propylene-oxide derivative, which thereby serves as an auxiliary solvent for the reaction.

Where the cyclohexyl-phenols and related compounds are employed as reactants, an alternative method may be employed which consists in reacting an aqueous solution of an alkali metal salt of the phenol with the propylene-oxide derivative at a temperature between 40° C. and the boiling temperature of the mixture. The desired product is recovered by decantation of the water-immiscible layer of the reaction product, and fractional distillation thereof.

The following examples describe in detail the preparation of certain individual members of our new class of compounds, but are not to be construed as limiting the invention.

Example 1

A mixture of 171 grams (1 mole) of 2-phenyl-cyclohexanol and 5.75 grams (0.25 mole) of finely divided metallic sodium was heated to 100°–130° C. for one hour to form the sodium salt of the hexanol derivative. The resulting product was added portion-wise to 69.5 grams (0.75 mole) of 1-chloro-propylene-oxide-2,3 over a period of one hour at 80°–90° C. The mixture was heated and stirred for an additional two hours at 90° C., cooled to room temperature, and filtered to remove sodium chloride and unreacted salt of phenyl-cyclohexanol. The filtrate was fractionally distilled to obtain 1-(2-phenyl-cyclohexanoxy)-propylene-oxide-2,3 as a water-white, mobile liquid boiling at 141°–151° C. at 0.1 inch pressure and having the specific gravity 1.033 at 25°/25° C. This compound was found valuable as a modifying agent in plastics comprising vinylidene chloride polymers.

Example 2

200 grams (2.0 moles) of cyclohexanol and 11.5 grams (0.5 mole) of finely divided metallic sodium were refluxed together to form the sodium salt of the cyclohexanol. The mixture was cooled and diluted with 100 milliliters of toluene to obtain a slurry of sodium-cyclohexanolate. This slurry was added portion-wise with stirring to 139 gram (1.5 moles) of 1-chloro-propylene-oxide-2,3 at 70°–90° C. over a period of one hour. The mixture was warmed at 90° C. for an additional five hours, and the desired ether compound thereafter recovered substantially as described in the foregoing example. 1-(cyclohexanoxy)-propylene-oxide-2,3 was thereby obtained as a water-white liquid boiling at 83°–88° C. at 0.15 inch pressure, and having a specific gravity of 1.019 at 25°/25° C. This compound was a sweet smelling oil particularly valuable as a perfume base.

Example 3

A mixture of 88 grams (0.5 mole) of 2-cyclohexylphenol, 21 grams (0.5 mole) of 95 per cent sodium hydroxide, and 100 milliliters of water was added portion-wise with stirring to 51 grams (0.55 mole) of 1-chloro-propylene-oxide-2,3 at 40°–45° C. over a period of forty-five minutes. The reaction mixture was heated and stirred for an additional hour at 80° C., thereafter cooled, and the water-immiscible layer separated by decantation. This crude ether product was washed with water and fractionally distilled, whereby there was obtained 1-(2-cyclohexyl-phenoxy)-propylene-oxide-2,3 as a colorless liquid boiling at 167°–175° C. at 0.55 inch pressure and having a specific gravity of 1.095 at 25°/25° C. This compound was a sweet smelling oil valuable both as a perfume base and as a fly toxic.

By substituting 1-chloro-2-methyl-propylene-oxide-2,3 for the chloro-propylene-oxide shown in the foregoing examples, the corresponding ether compounds thereof are formed. These compounds are similar in characteristic to the ethers shown above.

In a like manner, 1-chloro-propylene-oxide-2,3 and 1-chloro-2-methyl-propylene-oxide-2,3 may be reacted with other hydrogenated phenol compounds to obtain corresponding ethers of 2-chloro-cyclohexanol, 2-methyl-cyclohexanol, 4-tertiarybutyl-cyclohexanol, tetrahydro-alpha-naphthol, 4-cyclohexyl-phenol, 2-chloro-4-cyclohexyl-phenol, 2-cyclohexyl-4-tertiarybutyl-phenol, 3-phenyl-cyclohexanol, 4-cyclohexyl-cyclohexanol, and the like.

We claim:
1. A compound having the formula

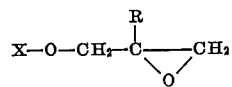

wherein X—O represents a hydrogenated phenol residue, and R represents a member of the group consisting of the methyl radical and hydrogen.

2. A compound having the formula

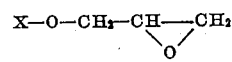

wherein X—O represents a hydrogenated phenol residue.

3. A compound having the formula

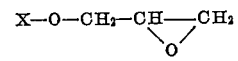

wherein X represents a hydrogenated diphenyl radical.

4. 1-(cyclohexanoxy)-propylene-oxide-2,3.
5. 1-(2-phenyl-cyclohexanoxy)-propylene-oxide-2,3.
6. 1-(2-cyclohexyl-phenoxy)-propylene-oxide-2,3.

HAROLD R. SLAGH.
FRANCIS N. ALQUIST.